(12) United States Patent
Beckford

(10) Patent No.: US 7,237,709 B2
(45) Date of Patent: Jul. 3, 2007

(54) METHOD OF MANUFACTURING AN ARTICLE BY DIFFUSION BONDING AND SUPERPLASTIC FORMING

(75) Inventor: Peter R Beckford, Derby (GB)

(73) Assignee: Rolls-Royce plc, London (GB)

( * ) Notice: Subject to any disclaimer, the term of this patent is extended or adjusted under 35 U.S.C. 154(b) by 273 days.

(21) Appl. No.: 10/913,469

(22) Filed: Aug. 9, 2004

(65) Prior Publication Data
US 2005/0035183 A1    Feb. 17, 2005

(30) Foreign Application Priority Data
Aug. 13, 2003   (GB) .................. 0318937.0

(51) Int. Cl.
B21D 39/00     (2006.01)
B23K 21/02     (2006.01)
B23K 28/00     (2006.01)

(52) U.S. Cl. ...................... 228/157; 228/193
(58) Field of Classification Search ............. None
See application file for complete search history.

(56) References Cited

U.S. PATENT DOCUMENTS

| 4,351,470 | A | * | 9/1982 | Swadling et al. ............ 228/157 |
| 5,099,573 | A | * | 3/1992 | Krauss et al. ............. 29/889.72 |
| 5,611,944 | A | * | 3/1997 | Gilkinson et al. ........ 219/117.1 |
| 6,129,261 | A | * | 10/2000 | Sanders ..................... 228/157 |
| 6,419,146 | B1 | * | 7/2002 | Buldhaupt et al. .......... 228/193 |

FOREIGN PATENT DOCUMENTS

| EP | 0 568 201 A | 11/1993 |
| EP | 0 568 201 A | 7/1996 |
| EP | 1 188 497 A | 3/2002 |
| EP | 1188497 A2 * | 3/2002 |
| EP | 1 260 300 A | 10/2003 |
| GB | 2 304 613 A | 3/1997 |
| GB | 2304613 A * | 3/1997 |
| GB | 2 306 353 A | 5/1997 |

* cited by examiner

*Primary Examiner*—Lynne R. Edmondson
(74) *Attorney, Agent, or Firm*—W. Warren Taltavull; Manelli Denison & Selter PLLC

(57) ABSTRACT

Two metal blocks (50, 52) are welded to respective metal sheets (30, 32) to form sealed assemblies. The sealed assemblies are then diffusion bonded together to form two metal preforms (54, 56). The thick ends (36) and (40) of the metal sheets (30, 32) and the metal blocks (50, 52) are hot formed so that a continuation of the plane X of the first surfaces (42, 46) of the metal sheets (30, 32) extends through and across the metal blocks (50, 52). The metal preforms (54, 56) are machined to remove the portion of the metal blocks (50, 52) extending above the first surfaces (42, 46) of the metal sheets (30, 32) respectively. The metal preforms (54, 56) and a metal sheet (58) are assembled into a stack (64). The metal preforms (54, 56) and the metal sheet (58) are diffusion bonded together and then superplastically formed to produce a hollow fan blade (10). The method enables thinner metal workpieces with better microstructure to be used and increases the yield of metal workpieces.

26 Claims, 3 Drawing Sheets

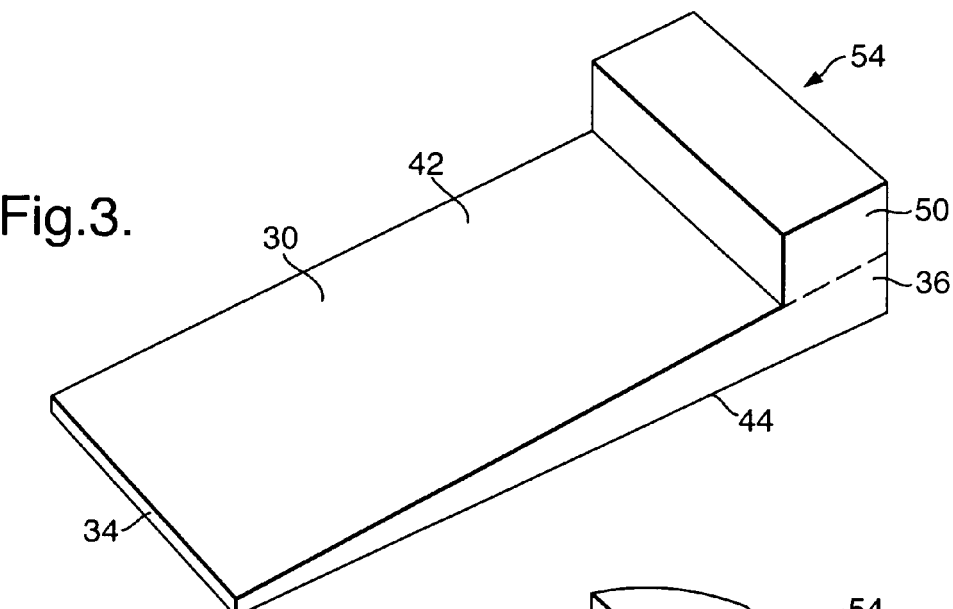
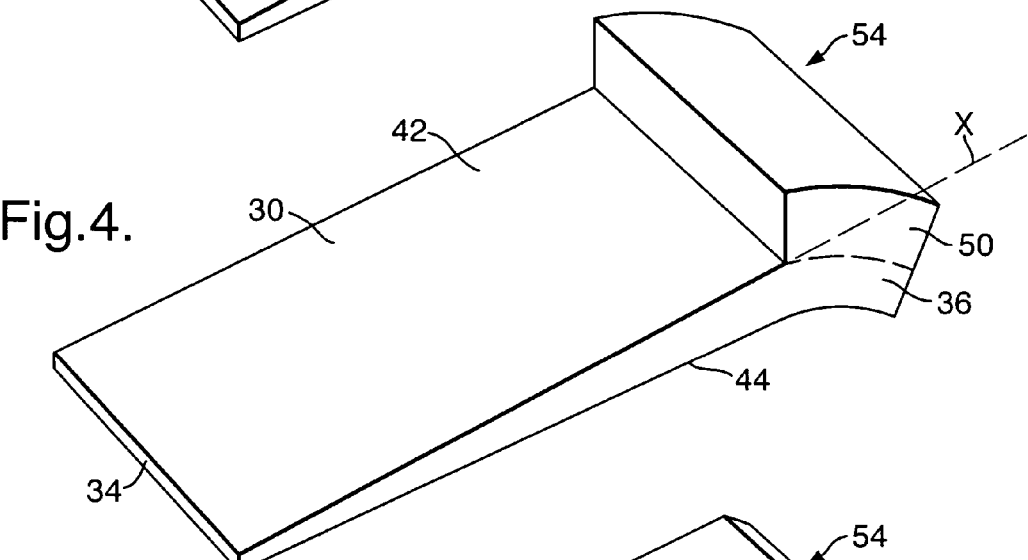
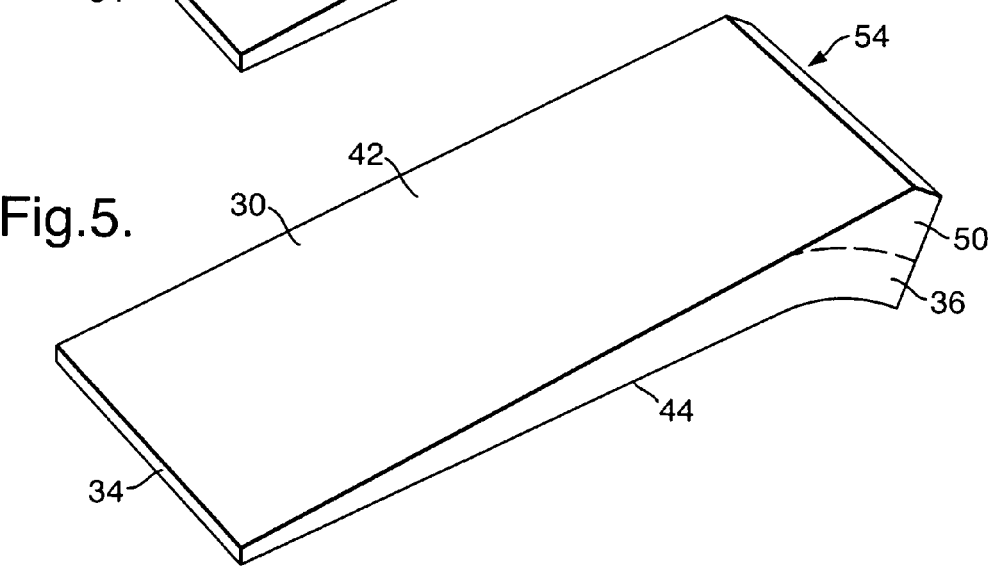

METHOD OF MANUFACTURING AN ARTICLE BY DIFFUSION BONDING AND SUPERPLASTIC FORMING

FIELD OF THE INVENTION

The present invention relates to a method of manufacturing an article by diffusion bonding and superplastic forming.

BACKGROUND OF THE INVENTION

It is known to manufacture hollow metallic articles by diffusion bonding and superplastic forming metal workpieces. These metal workpieces include elementary metal, metal alloys, intermetallic materials and metal matrix composites.

The diffusion bonding and superplastic forming process may be used to produce contoured articles for example fan blades, or fan duct outlet guide vanes, for gas turbine engines by superplastically, or hot forming, an integral structure formed by the diffusion bonding process.

A procedure for manufacturing an article by diffusion bonding and superplastic forming is disclosed in our European patent EP0568201B. In EP0568201B the integral structure formed by the diffusion bonding process is twisted before the integral structure is superplastically formed. Additionally the integral structure is hot creep formed in the superplastic forming dies.

Additionally our UK patent GB2306353B discloses manufacturing a fan blade by diffusion bonding and superplastic forming. In GB2306353B the integral structure is formed from two metallic workpieces which subsequently define the outer profile of the fan blade. The two metallic workpieces are produced by cutting an inclined slot through a parallelepiped metal block to produce two longitudinally tapering metallic workpieces. The thicker ends of the metallic workpieces are aligned to form the root of the fan blade and the remainder of the metallic workpieces are machined to the appropriate thickness to give the required mass distribution.

This manufacturing process requires that the thickness of the original parallelepiped metallic block is about half, just less than half, of the thickness of the root of the finished fan blade in order to allow machining to produce the root. A problem with this process is that it is wasteful of metal, machining time and is expensive. Additionally the microstructure of the parallelepiped metallic block is not the optimum microstructure, due to the thickness of the original metallic block.

The problem is partially overcome, as also disclosed. in GB2306353B, by using thinner parallelepiped metallic blocks and adding extra small metallic blocks at the thicker ends of the two longitudinally tapering metallic workpieces to form the root of the fan blade. The metallic blocks are initially welded to the parallelepiped metallic blocks to seal them together before they are diffusion bonded together. The welding process introduces a "heat affected zone" in which material properties are compromised. This gives a minimum thickness of the parallelepiped metallic blocks from which the fan blade may be manufactured because the properties of the metal may not be degraded on the surfaces of the fan blade root.

SUMMARY OF THE INVENTION

Accordingly the present invention seeks to provide a novel method of manufacturing an article by diffusion bonding which overcomes the above-mentioned problems.

Accordingly the present invention provides a method of manufacturing an article of predetermined finished profile by diffusion bonding and superplastic forming at least two metal workpieces and two metal blocks comprising the steps of:

(a) forming at least two metal workpieces, each metal workpiece has at least one surface,
(b) forming two metal blocks,
(c) arranging each metal block adjacent to an end of the at least one surface of a respective one of the at least two metal workpieces,
(d) applying heat and pressure across the thickness of each metal block and the respective one of the at least two metal workpieces to diffusion bond the metal block and the respective one of the at least two metal workpieces together to form two integral metal preforms,
(e) applying heat and forming the two integral metal preforms such that metal block and the end of the metal workpiece of each integral metal preform are formed such that a continuation of the remainder of the at least one surface of the respective metal workpiece extends through and across the metal block,
(f) machining the metal block of each integral metal preform such that the new surface of the metal block is aligned with the remainder of the at least one surface of the respective metal workpiece,
(g) applying a stop off material to prevent diffusion bonding to preselected areas of at least one of the surfaces of at least one of the at least two metal workpieces of the two integral metal preforms,
(h) assembling the at least two integral metal preforms into a stack relative to each other so that the metal blocks are between the metal workpieces and the surfaces of the at least two metal workpieces and the two metal blocks are in mating abutment,
(i) applying heat and pressure across the thickness of the at least two integral metal preforms to diffusion bond the at least two integral metal preforms together in areas other than the preselected areas to form an integral structure with a region of increased thickness,
(j) heating the integral structure and internally pressurising the integral structure to cause the preselected area of at least one of the metal workpieces to be hot formed to produce a hollow article of predetermined shape.

The method may comprise after step (i) and before step (j) placing the integral structure in a hot creep forming die, heating the integral structure while it is within the die to cause the integral structure to be hot creep formed on the convex surface of the die.

Preferably step (a) comprises forming a first metal workpiece, a second metal workpiece and a third metal workpiece, the third metal workpiece having two flat surfaces, and step (h) comprises assembling the third metal workpiece into the stack so that third metal workpiece is between the two integral metal preforms and the surfaces of the workpieces are in mating abutment. Preferably the hollow article is a fan blade or a compressor blade.

Alternatively step (a) comprises forming a first metal workpiece and a second metal workpiece. The hollow article may be a fan outlet guide vane, a compressor blade or a fan blade.

Preferably after diffusion bonding the stack of metal preforms and before superplastically forming the integral structure, the integral structure is heated and loads are applied to opposite ends of the integral structure to twist one end relative to the other end to contour the integral structure to a predetermined shape.

Preferably after twisting the integral structure and before superplastic forming the integral structure, the contoured integral structure is internally pressurised to break the adhesive bond between the stop off material and the at least one workpiece in the preselected area.

Alternatively after diffusion bonding the stack of metal preforms and before superplastically forming the integral structure, the integral structure is internally pressurised to break the adhesive bond between the stop off material and the at least one workpiece in the preselected area.

Preferably after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

Preferably after the metal preforms are arranged in a stack and before the metal workpieces are diffusion bonded together to form an integral structure, the edges of the metal preforms are sealed. Preferably the edges of the metal preforms are welded together.

Preferably after each metal block is arranged adjacent the respective metal workpiece and before the metal block and metal workpiece are diffusion bonded together to form a metal preform, the edges of each metal block is sealed to the respective metal workpiece. Preferably the edges of each metal block is welded to the respective metal workpiece.

Preferably the metal workpieces and the metal blocks are made of a titanium alloy, the metal workpieces and metal blocks are heated to a temperature equal to, or greater than, 850° C. and the pressure applied is equal to, or greater than, $20 \times 10^5$ $Nm^{-2}$ to diffusion bond the metal blocks and metal workpieces together to form the integral metal preforms.

Preferably the metal workpieces are heated to a temperature between 900° C. and 950° C. and the pressure applied is between $20 \times 10^5$ $Nm^{-2}$ and $30 \times 10^5$ $Nm^{-2}$.

Preferably the integral metal preforms are heated to a temperature equal to, or greater than, 850° C. and the pressure applied is equal to, or greater than, $20 \times 10^5$ $Nm^{-2}$ to diffusion bond the integral metal preforms together to form the integral structure.

Preferably the integral metal preforms are heated to a temperature between 900° C. and 950° C. and the pressure applied is between $20 \times 10^5$ $Nm^{-2}$ and $30 \times 10^5$ $Nm^{-2}$.

Preferably the integral structure is heated to a temperature equal to, or greater than, 850° C. to superplastically form the integral structure.

Preferably the integral structure is heated to a temperature between 900° and 950° C.

Preferably the integral structure is hot creep formed at a temperature equal to, or greater than, 740° C.

Preferably the method comprises machining the integral structure at the ends of the metal workpieces adjacent the metal blocks. Preferably the ends of the metal workpieces are machined to form a dovetail root or a fir-tree root.

Preferably in step (a) each of the at least two metal workpieces has at least one flat surface.

Preferably step (a) comprises forming at least one longitudinally tapering metal workpiece and step (c) comprises arranging one metal block adjacent to the thicker end of the at least one surface of the tapering metal workpiece. Preferably step (a) comprises forming two longitudinally tapering metal workpieces, step (c) comprises arranging each metal block adjacent the thicker end of the respective tapering metal workpiece.

BRIEF DESCRIPTION OF THE DRAWINGS

The present invention will be more fully described by way of example with reference to the accompanying drawings in which:

FIG. 3 is a perspective view of one of the metal workpieces and one of the metal blocks shown in FIG. 2 showing the metal preform after the diffusion bonding step has been performed.

FIG. 4 is a perspective view of the metal preform shown in FIG. 3 after the hot forming step has been performed.

FIG. 5 is a perspective view of the metal preform shown in FIG. 4 after the machining step has been performed.

DETAILED DESCRIPTION OF THE INVENTION

Figure 1:
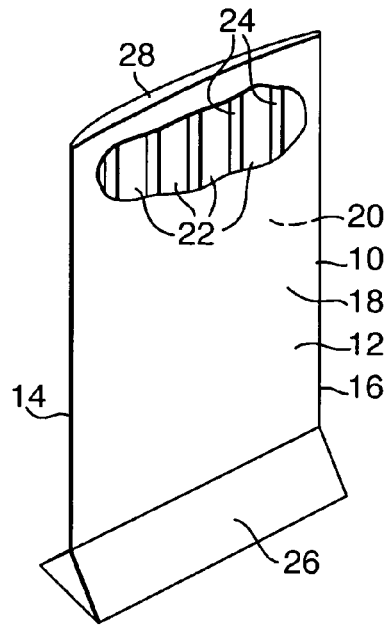
FIG. 1 shows an article manufactured by superplastic forming and diffusion bonding according to the present invention.

A turbofan gas turbine engine fan blade 10, shown in FIG. 1, comprises an aerofoil shaped body 12 which has a leading edge 14, a trailing edge 16, a concave surface 18, a convex surface 20, a root 26 and a tip 28. The fan blade 10 is hollow and comprises a plurality of spaces 22 within the aerofoil shaped body 12 separated by a warren girder structure 24.

Figure 2:
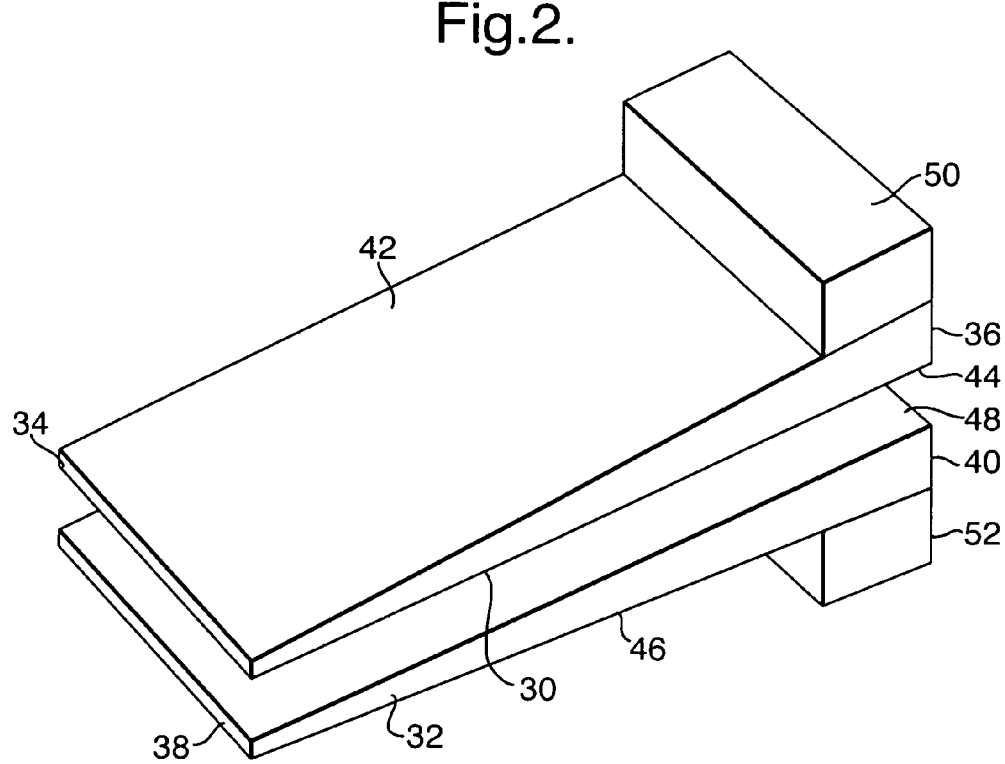
FIG. 2 illustrates an exploded view of two metal workpieces and two metal blocks, which are diffusion bonded to form two metal preforms to manufacture an article according to the present invention.

In FIG. 2 two titanium alloy sheets 30 and 32 are produced by cutting an original parallelepiped block of titanium along an inclined plane to form the two longitudinally tapering metallic titanium sheets 30 and 32 as described more fully in our UK patent GB2306353B. The sheets of titanium alloy 30 and 32 have thin ends 34 and 38 and thick ends 36 and 40 respectively. The titanium alloy sheets 30 and 32 taper, increasing in thickness, longitudinally from the thin end 34, 38 to the thick ends 36 and 40. The sheets of titanium alloy 30 and 32 have first surfaces 42 and 46 and second surfaces 44 and 48 respectively. Two blocks of titanium alloy 50 and 52 are produced and each of the blocks of titanium alloy 50 and 52 is positioned in mating relationship adjacent the first surface 42 and 46 of the titanium alloy sheets 30 and 32 respectively at the thick ends 36 and 40 of the titanium alloys sheets 30 and 32.

The edges of the blocks of titanium alloy 50 and 52 are welded to the respective sheets of titanium alloy 30 and 32 to form sealed assemblies and the interiors of the sealed assemblies are evacuated. The sealed assemblies are then diffusion bonded together to form two titanium alloy preforms 54 and 56, only titanium alloy preform 54 is shown in FIG. 3.

The titanium alloy preforms 54 and 56 are then hot formed to bend the portions of the titanium alloy preforms 54 and 56 that was originally the thick ends 36 and 40 of the titanium alloy sheets 30 and 32 respectively and the associated titanium alloy blocks 50 and 52 respectively. In particular the thick ends 36 and 40 of the titanium alloy sheets 30 and 32 and the titanium alloy blocks 50 and 52 are hot formed so that a continuation of the plane X of the first surfaces 42 and 46 of the titanium alloy sheets 30 and 32 extends through and across the titanium alloy blocks 50 and 52 respectively, again only titanium alloy preform 54 is shown in FIG. 4.

The titanium alloy preforms 54 and 56 are then machined to remove the portion of the titanium alloy blocks 50 and 52 extending above the first surfaces 42 and 46 of the titanium alloy sheets 30 and 32 respectively, only titanium alloy preform 54 is shown in FIG. 5.

Figure 6:
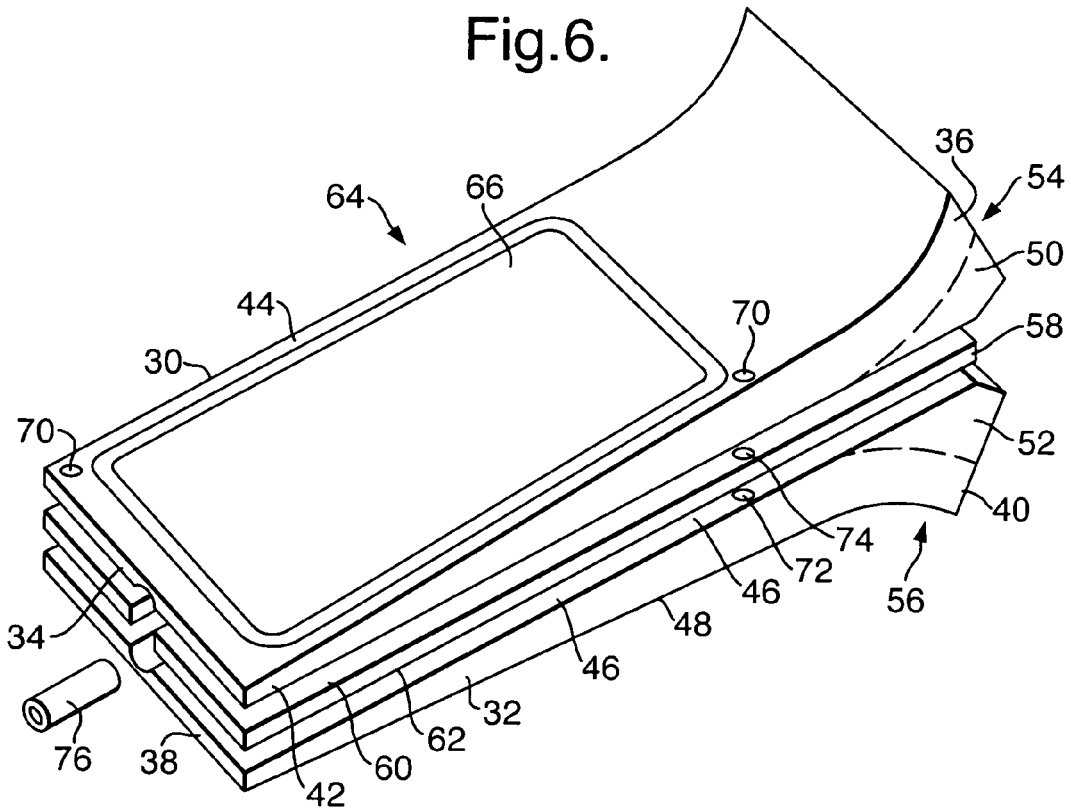
FIG. 6 illustrates an exploded view of a stack of two metal preforms and a metal workpiece, which are superplastically formed, and diffusion bonded to form an article according to the present invention.

In FIG. 6 the titanium alloy preforms 54 and 56 and a titanium alloy sheet 58 are assembled into a stack 64. The titanium alloy preform 54 has a flat first surface 42, the titanium alloy preform 56 has a flat first surface 46 and the titanium alloy sheet 58 has two flat surfaces 60 and 62. The flat surfaces 42 and 60 of the titanium alloy preform 54 and the titanium alloy sheet 58 respectively are arranged to abut each other and the flat surfaces 46 and 62 of the titanium alloy preform 56 and the titanium alloy sheet 58 respectively are arranged to abut each other.

Prior to assembling the titanium alloy preforms 54 and 56 and the titanium alloy sheet 58 into the stack 64, the first titanium alloy sheet 30 is machined in a region 66, centrally of the second surface 44 of the first titanium alloy sheet 30, and the second titanium alloy sheet 32 is machined in a region 68, centrally of the second surface 48 of the second titanium alloy sheet 32. The central machined regions 66 and 68 are contoured to produce a variation in the mass distribution of the fan blade 10 from leading edge 14 to trailing edge 16 and from root 26 to tip 28 by varying the depth of machining. For example by varying the thickness of the first and second sheets 30 and 32, across the central machined region 66 and 68 in the direction between the edges and in the direction between the thin ends 34, 38 and the thick ends 36, 40 of the first and second titanium alloy sheets 32.

The machining of the central machined regions 66 and 68 of the first and second titanium alloy sheets 30 and 32 respectively is by milling, electrochemical machining, chemical machining, electro discharge machining or any other suitable machining process.

The abutting surfaces 42 and 60 of the titanium alloy preform 54 and the titanium alloy sheet 58 respectively and the abutting surfaces 46 and 62 of the titanium alloy preform 56 and the titanium alloy sheet 58 respectively are then prepared for diffusion bonding by chemical cleaning. One of the abutting surfaces 42 and 60, in this example surface 42, has had a stop off material applied. Similarly one of the abutting surfaces 46 and 62, in this example surface 46, has had a stop off material applied. The stop off material may comprise powdered yttria in a binder and solvent e.g. the stop off known as "Stopyt 62A" which is sold by an American company named GTE Service Corporation of 100 Endecott Street, Danvers, Mass. 10923, USA.

The stop off material is applied in desired patterns, by the known silk screen printing process. The desired patterns of stop off material prevent diffusion bonding between preselected areas of the titanium alloy preforms 54 and 56 and the titanium alloy sheet 58. In this example the stop off material is applied in straight lines on the surfaces 42 and 46 of the titanium alloy preforms 54 and 56 except for regions adjacent the edges and ends sufficient to provide a satisfactory diffusion bond.

The titanium alloy sheet 30 has a pair of dowel holes 70, which are axially aligned with corresponding dowel holes 72 in titanium alloy sheet 32 and dowel holes 74 in titanium alloy sheet 58 to ensure the correct positional relationship between the three sheets 30, 32 and 58. The sheets 30, 32 and 58 are maintained in this positional relationship by a pair of dowels (not shown), which are inserted into the axially aligned dowel holes 70, 72 and 74.

The titanium alloy sheets 30 and 32 of the titanium alloy preforms 54 and 56 and the titanium alloy sheet 58 of the stack 64 are placed together to trap an end of a pipe 76. In this example a groove 78 is machined on first surface 42 of the first sheet 30 and a groove 80 is machined on first surface 46 of the second sheet 32 and a slot 82 is machined in the third sheet 58. The pipe 76 is positioned to project from between the three titanium alloy sheets 30, 32 and 58. One end of the pipe 76 interconnects with the pattern of stop off material between the titanium alloy sheets 30, 32 and 58. On completion of the assembly in the manner described it is welded about its periphery so as to weld the edges and ends of the titanium alloy sheets 30, 32 of the titanium alloy preforms 54 and 56 to the titanium alloy sheet 58 together. The pipe 76 is also welded around its periphery to the titanium alloy sheets 30 and 32 of the titanium alloy preforms 54 and 56 and to the titanium alloy sheet 58. A welded assembly is formed which is sealed except for the inlet provided by the pipe 70.

It is to be noted that the pipe 76 is located at one end, in this example the end, which subsequently forms the tip 28 of the fan blade 10, of the sealed assembly.

The pipe 76 is then connected to a vacuum pump, which is used to evacuate the interior of the welded assembly and then inert gas, for example argon, is supplied to the interior of the welded assembly. This evacuating and supplying inert gas to the interior of the welded assembly may be repeated several times in order to ensure that most, or substantially all, traces of oxygen are removed from the interior of the welded assembly. The particular number of times that the interior of the welded assembly is evacuated and purged with inert gas depends upon the size of the workpieces and upon the required integrity of the finished component or article. The smaller the traces of oxygen remaining, the greater is the quality of the subsequent diffusion bond. The inert gas is supplied to pressurise the interior of the welded assembly to atmospheric pressure.

The welded assembly is evacuated and is placed in an oven. The welded assembly is then heated to a temperature between 250° C. and 350° C. to evaporate the binder from the stop off material. During the baking out of the binder, the welded assembly is continuously evacuated to remove the binder from between the titanium alloy sheets 30, 32 and 34. After the binder has been removed, which is determined either by monitoring the binder levels in the gas extracted from the welded assembly or by maintaining the welded assembly at the temperature between 250° C. and 350° C. for a predetermined time, the welded assembly is removed from the oven and is allowed to cool to ambient temperature whilst being continuously evacuated. The binder is baked out of the welded assembly at a suitably low temperature to reduce, or prevent, oxidation of the exterior surface of the welded assembly.

The pipe 76 is then sealed so that there is a vacuum in the welded assembly and thus a sealed assembly is formed. The sealed assembly is then transferred carefully to an autoclave. The temperature in the autoclave is increased such that the sealed assembly is heated to a temperature greater than 850° C. The argon pressure in the autoclave is raised to greater than 20 atmospheres, 294 pounds per square inch ($20.26 \times 10^5$ $Nm^{-2}$) and held at that temperature and pressure for a predetermined time. Preferably the sealed assembly is heated to a temperature between 900° C. and 950° C. and the pressure is between 294 pounds per square inch ($20.26 \times 10^5$ $Nm^{-2}$) and 441 pounds per square inch ($30.39 \times 10^5$ $Nm^{-2}$).

Figure 7:
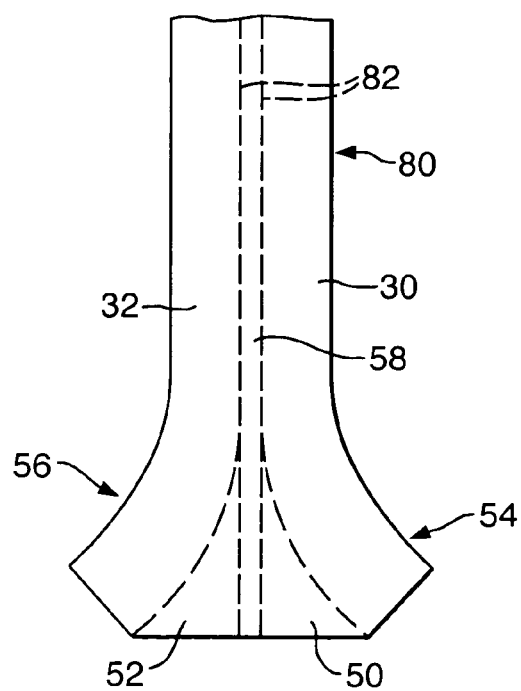
FIG. 7 is a side view of the stack of metal preforms and metal workpieces shown in FIG. 6 after diffusion bonding.

For example if the sealed assembly is heated to a temperature of 925° C. and the pressure is raised to 300 pounds per square inch the temperature and pressure are held constant for about two hours. The pressure is then reduced to ambient, diffusion bonding having been achieved and the sealed assembly, which is then an integral structure 80, is removed from the autoclave. The diffusion bonding has occurred at regions 82 indicated by dashed lines and diffusion bonding has been prevented at other regions as shown in FIG. 7.

The pipe 76 is removed from the integral structure 80 and a second pipe is fitted to the integral structure 80.

The integral structure 80 is then placed in a hot creep forming die and the integral structure 80 is heated while it is within the die to cause the integral structure 80 to be hot creep to produce an aerofoil shape. During the hot creep forming process the integral structure is heated to a temperature of 740° C.

The hot creep formed integral structure 80 is then placed in a superplastic forming die, which comprises a concave surface and a convex surface. Inert gas, for example argon, is introduced into the areas, within the hot creep formed integral structure 80, containing the stop off material in order to break the adhesive grip, which the diffusion bonding pressure has brought about. The argon is carefully introduced to those areas which contain the stop off material, and the argon seeps through the stop off material and eventually reaches the opposing end of the hot creep formed integral structure 80. The argon must travel the whole length of the interior of the hot creep formed integral structure 80 such as to break the adhesive grip between the stop off material and the titanium alloy sheets 30, 32 and 58 brought about during the diffusion bonding step.

This step may be carried out at room temperature because the metal is elastic at room temperature and the minimal extension, which occurs, does not go beyond the elastic limit. Consequently the hot creep formed integral structure 80 regains its shape when pressure is removed at the end of the step. Alternatively the step may be carried out at the superplastic forming temperature, however there is a serious risk of progressive plastic deformation lengthwise of the hot creep formed integral structure 80, rather than simultaneous deformation over the whole of the hot creep formed integral structure 80. Nevertheless the skilled artisan will be able to control the breaking of the adhesive grip by suitable control of the pressure of the argon.

The second pipe is then connected to a vacuum pump which is used to evacuate the interior of the hot creep formed integral structure 80 and then inert gas, for example argon, is supplied to the interior of the hot creep formed integral structure 80. This process of evacuating and supplying inert gas to the interior of the hot creep formed integral structure 80 may be repeated several times in order to ensure that most, or substantially all, traces of oxygen are removed from the interior of the hot creep formed integral structure 80. The particular number of times that the interior of the hot creep formed integral structure 80 is evacuated and purged with inert gas depends upon the size of the workpieces and upon the required integrity of the finished component. The inert gas is supplied to pressurise the interior of the hot creep formed integral structure 80 to atmospheric pressure.

The hot creep formed integral structure 80 and superplastic forming die is placed in an autoclave. The hot creep formed integral structure 80 is again heated to a temperature greater than 850° C., preferably between 900° C. and 950° C. In this example, the dies and hot creep formed integral structure 80 are heated to 925° C. Inert gas, for example argon, is introduced into the interior of the hot creep formed integral structure 80 between the titanium alloy sheets 30, 32 and 58, so as to hot form the titanium alloy sheets 30 and 32 onto the surfaces of the die. This superplastically forms the titanium alloy sheet 58 to generate a hollow internal structure depending on the pattern of the applied stop off material.

The magnitude of the movement of at least one of the sheets during deformation is such as to require superplastic extension to occur. The term "superplastic" is a standard term in the metal forming art and will not be described herein.

In order to achieve superplastic forming without rupturing the thinning metal the argon is introduced in a series of pulses, at a pre-calculated rate which will achieve a desired strain rate, as is taught at pp 615-623 in the book "The Science, Technology and Application of Titanium" edited by R. I. Jaffe and N. E. Promisel, published by Pergamon Press in 1970, which is hereby incorporated by reference. The method ensures that the metal is subjected to that strain rate which will achieve the maximum permissible speed of extension at any given point in the procedure. The rate of application, and/or volume of the pulses of the gas pulses may thus vary during the expansion of the titanium alloy sheets 30, 32 and 58.

On completion of hot forming/superplastic forming, the inert argon atmosphere within the integral structure is maintained whilst the structure is cooled. The integral structure is then machined and/or ground to remove excess metal and to produce the required leading edge and trailing edge shapes 14 and 16 of the finished fan blade 10 and to machine the increased thickness region where the titanium alloy blocks 50 and 52 are to produce a dovetail root or fir-tree root 26.

The advantage of the present invention is that thinner original parallelepiped metallic blocks are used. This enables the use of metallic blocks, and hence metallic workpieces, with improved microstructure. The present invention incorporates the metallic blocks internally of the fan blade so that the "heat affected zone or zones" are positioned at less sensitive regions away from the surfaces of the fan blade root.

The use of thinner parallelepiped metallic blocks enables more metallic workpieces to be obtained from a single ingot of metal and thus more fan blades from a single ingot of metal.

Although the description has referred to the manufacture of a fan blade, the present invention is also applicable to the manufacture of a compressor blade. Although the description has referred to the manufacture of a fan blade using two metal preforms and a third metal sheet positioned between the two metal preforms it may be possible to simply use the two metal preforms without an additional metal workpiece, this would be suitable for manufacturing a fan blade, a compressor blade, a fan outlet guide vane or a compressor vane. In this instance the fan blade, compressor blade, fan outlet guide vane or compressor vane is a simple hollow structure without a warren girder structure.

Although the description has referred to fan blades, compressor blades and fan outlet guide vanes the invention is equally applicable to other hollow articles, or hollow components, requiring a region of increased thickness to form an attachment feature or for other purposes.

Although the description has referred to titanium alloy sheets, or workpieces, and titanium alloy blocks, the invention is equally applicable to other metal sheets, or workpieces, and metal blocks, which may be hot formed or superplastically formed.

Although the description has referred to diffusion bonding flat surfaces of the metal workpieces it may be possible to diffusion bond contoured surfaces of the metal workpieces.

I claim:

1. A method of manufacturing an article of predetermined finished profile by diffusion bonding and superplastic forming at least two metal workpieces and two metal blocks comprising the steps of:
   (a) forming at least two metal workpieces, each metal workpiece has at least one surface,
   (b) forming two metal blocks,
   (c) arranging each metal block adjacent to an end of the at least one surface of a respective one of the at least two metal workpieces,
   (d) applying heat and pressure across the thickness of each metal block and the respective one of the at least two metal workpieces to diffusion bond the metal block and the respective one of the at least two metal workpieces together to form two integral metal preforms,
   (e) applying heat and forming the two integral metal preforms such that metal block and the end of the metal workpiece of each integral metal preform are formed such that a continuation of the remainder of the at least one surface of the respective metal workpiece extends through and across the metal block,
   (f) machining the metal block of each integral metal preform such that the new surface of the metal block is aligned with the remainder of the at least one surface of the respective metal workpiece,
   (g) applying a stop off material to prevent diffusion bonding to preselected areas of at least one of the surfaces of at least one of the at least two metal workpieces of the two integral metal preforms,
   (h) assembling the at least two integral metal preforms into a stack relative to each other so that the metal blocks are between the metal workpieces and the surfaces of the at least two metal workpieces and the two metal blocks are in mating abutment,
   (i) applying heat and pressure across the thickness of the at least two integral metal preforms to diffusion bond the at least two integral metal preforms together in areas other than the preselected areas to form an integral structure with a region of increased thickness,
   (j) heating the integral structure and internally pressurising the integral structure to cause the preselected area of at least one of the metal workpieces to be hot formed to produce a hollow article of predetermined shape.

2. A method as claimed in claim 1 wherein the method comprises after step (i) and before step (j) placing the integral structure in a hot creep forming die, heating the integral structure while it is within the die to cause the integral structure to be hot creep formed on the convex surface of the die.

3. A method as claimed in claim 1 wherein step (a) comprises forming a first metal workpiece, a second metal workpiece and a third metal workpiece, the third metal workpiece having two flat surfaces, and step (h) comprises assembling the third metal workpiece into the stack so that third metal workpiece is between the two integral metal preforms and the surfaces of the metal workpieces are in mating abutment.

4. A method as claimed in claim 3 wherein the hollow article is a fan blade or a compressor blade.

5. A method as claimed in claim 1 wherein step (a) comprises forming a first metal workpiece and a second metal workpiece.

6. A method as claimed in claim 5 wherein the hollow article is a fan outlet guide vane, a compressor blade or a fan blade.

7. A method as claimed in claim 1 wherein after diffusion bonding the stack of metal preforms and before superplastically forming the integral structure, the integral structure is heated and loads are applied to opposite ends of the integral structure to twist one end relative to the other end to contour the integral structure to a predetermined shape.

8. A method as claimed in claim 7 wherein after twisting the integral structure and before superplastic forming the integral structure, the contoured integral structure is internally pressurised to break the adhesive bond between the stop off material and the at least one workpiece in the preselected area.

9. A method as claimed in claim 1 wherein after diffusion bonding the stack of metal preforms and before superplastically forming the integral structure, the integral structure is internally pressurised to break the adhesive bond between the stop off material and the at least one workpiece in the preselected area.

10. A method as claimed in claim 9 wherein after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

11. A method as claimed in claim 1 wherein after the metal preforms are arranged in a stack and before the metal workpieces are diffusion bonded together to form an integral structure, the edges of the metal preforms are sealed.

12. A method as claimed in claim 11 wherein the edges of the metal preforms are welded together.

13. A method as claimed in claim 1 wherein after each metal block is arranged adjacent the respective metal workpiece and before the metal block and metal workpiece are diffusion bonded together to form a metal preform, the edges of each metal block is sealed to the respective metal workpiece.

14. A method as claimed in claim 13 wherein the edges of each metal block is welded to the respective metal workpiece.

15. A method as claimed in claim 1 wherein the metal workpieces and the metal blocks are made of a titanium alloy, the metal workpieces and metal blocks are heated to a temperature equal to, or greater than, 850° C. and the pressure applied is equal to, or greater than, $20 \times 10^5$ $Nm^{-2}$ to diffusion bond the metal blocks and metal workpieces together to form the integral metal preforms.

16. A method as claimed in claim 15 wherein the metal workpieces are heated to a temperature between 900° C. and 950° C. and the pressure applied is between $20 \times 10^5$ $Nm^{-2}$ and $30 \times 10^5$ $Nm^{-2}$.

17. A method as claimed in claim 15 wherein the integral metal preforms are heated to a temperature equal to, or greater than, 850° C. and the pressure applied is equal to, or greater than, $20 \times 10^5$ $Nm^{-2}$ to diffusion bond the integral metal preforms together to form the integral structure.

18. A method as claimed in claim 17 wherein the integral metal preforms are heated to a temperature between 900° C. and 950° C. and the pressure applied is between $20 \times 10^5$ $Nm^{-2}$ and $30 \times 10^5$ $Nm^{-2}$.

19. A method as claimed in claim 1 wherein the integral structure is heated to a temperature equal to, or greater than, 850° C. to superplastically form the integral structure.

20. A method as claimed in claim 19 wherein the integral structure is heated to a temperature between 900° and 950° C.

21. A method as claimed in claim 2 wherein the integral structure is hot creep formed at a temperature equal to, or greater than, 740° C.

22. A method as claimed in claim 1 comprising machining the integral structure at the ends of the metal workpieces adjacent the metal blocks.

23. A method as claimed in claim 22 wherein the ends of the metal workpiece are machined to form a dovetail root or a fir-tree root.

24. A method as claimed in claim 1 wherein in step (a) each of the at least two metal workpieces has at least one flat surface.

25. A method as claimed in claim 1 wherein step (a) comprises forming at least one longitudinally tapering metal workpiece and step (c) comprises arranging one metal block adjacent to the thicker end of the at least one surface of the tapering metal workpiece.

26. A method as claimed in claim 25 wherein step (a) comprises forming two longitudinally tapering metal workpieces, step (c) comprises arranging each metal block adjacent the thicker end of the respective tapering metal workpiece.

* * * * *